United States Patent Office 3,597,235
Patented Aug. 3, 1971

3,597,235
PRESERVATION OF HARVESTED PRODUCE WITH OXYGEN-FREE ENZYMOCIDAL AND BACTERICIDAL GASES
Amihud Kramer, Silver Spring, Md., assignor to Food Technology Corporation, South Reston, Va.
No Drawing. Filed May 9, 1968, Ser. No. 728,315
Int. Cl. A23l 3/00
U.S. Cl. 99—154
10 Claims

ABSTRACT OF THE DISCLOSURE

There is provided a process for the preservation of raw and fresh biological harvested produce which comprises the steps of subjecting the produce to a sub-atmospheric pressure for a period of time at least sufficient to substantially evacuate the gaseous oxygen content from the tissue structure thereof; subsequently exposing the substantially oxygen-free produce to an enzymocidal gas for a time period at least sufficient to substantially deactivate the deteriorative oxidative enzyme content within the produce; and simultaneously with or subsequent to the exposure to an enzymocidal gas, also exposing the produce to a bactericidal gas for a period of time at least sufficient to sterilize the produce. The so-treated produce is rendered substantially biostatic and preserved against normal bacterial and enzymatic deterioration and spoilage on sustained storage.

---

This invention relates to the art of preservation of biological harvested organs which are food materials, and in particular to the preservation of fruit and vegetable produce.

In general, methods for the preservation of food materials are directed at the goal of inactivating the deteriorative enzyme systems and microorganisms present in the food materials, and thereafter packaging the food material in such a way as to avoid recontamination with such materials. Under such conditions, the food materials become biostatic, i.e. do not substantially change in color, taste, consistency or edibility for a sustained period of time. The most widely used method for the preservation of food involves the application or withdrawal of heat, i.e. cooking or freezing, coupled with packaging in hermetically sealed containers, or the like, to prevent recontamination. However, chemical additives, the withdrawal of moisture (e.g., by drying in one way or another), and electroradiation methods are also used, but to a lesser extent, for preservation purposes.

The present invention is directed to a different method of preservation whch may be termed, "gaseous preservation," and is to be distinguished from non-preservation uses of gases, the so-called "extended shelf-life" processes where storage is under an "inert" or "controlled" atmosphere, e.g. nitrogen, argon, carbon dioxide. The present invention is to also be distinguished from the use of gases for sterilizing food products. In a few instances, chemical gases have been used in connection with certain naturally dry foodstuffs (i.e., spices, grains and the like) to effect sterilization thereof. Ethylene oxide has been used as the gaseous agent for such sterilization. The effect of this gas has been, however, merely germicidal (sterilization) rather than biostatic.

Other gaseous materials have also been investigated or used to some extent, especially in connection with a known method of preservation. For instance, sulfur dioxide has been used for the treatment of fruits and vegetables prior to preservation by dehydration in order to retain color. Also sulfur dioxide has been used to extend the storage life of fresh grapes and prevent discoloration. It has been postulated by the art that sulfur dioxide inhibits the enzyme catalyzed oxidative discoloration of fruit and vegetables.

Other gases have also been investigated for various reasons and to varying degrees, and with varying degrees of success. Among these gases are carbon dioxide, nitrogen trichloride, formaldehyde, nitrous oxide and $\beta$-propiolactone.

As will be appreciated, the uses of gases mentioned above are to effect sterilization and/or promote color retention; they are not preservation methods, i.e. biostatic methods, although the gases have been used in connection with a known biostatic method.

The various methods of preservation have certain advantages and disadvantages. For example, cooking allows storage at room temperature, but of course does not preserve the "fresh taste" and requires a sealed container. Freezing essentially preserves the "fresh taste" but requires refrigeration and is generally unsuited for long term storage of fruits and vegetables. Drying allows longer storage at room temperature and without sealed containers but destorys the "fresh taste." Chemical additives and electroradiation adversely effects the taste and texture of fruits and vegetables.

Accordingly, it would be desirable and is an object of the invention to preserve foods in such a manner that they can be stored at room temperature, do not lose the fresh taste, do not discolor significantly and remain essentially unchanged as to texture and appearance.

It is a further object of the present invention to provide a novel and advantageous gaseous preservation method and process for preserving raw and fresh fruit and vegetable produce.

Broadly stated, it has now been discovered that fruit and vegetable produce may be preserved to an unusually excellent degree if such produce is first subjected to a subatmospheric pressure to extract substantially all of the gaseous oxygen content therefrom. Thereafter, the produce is enzymocidally treated by exposure to an atmosphere of a gas having enzymocidal activity. Thereafter, or simultaneously with but not preceding the enzymocidal treatment, the produce is also exposed to an atmosphere of a gas having bactericidal characteristics. It has been found that on storage the so treated produce retains good color and texture and is biostatic. Storage of the so-treated produce may be at normal and ambient temperatures, and may even be in an oxygen atmosphere, provided that re-contamination of the produce with enzyme or bacteria does not occur.

The present invention is based upon the discovery that a combination of enzymocidal and bactericidal gases are effective for preserving fresh or raw fruit and vegetable produce when the gases are used in a particular fashion as noted above. It has been found that with such preservation, long term storage can be achieved with a high degree of satisfaction. By this method, the produce may be preserved in substantially its original state, except for a certain amount of mechanical commutation thereof, with excellent retention of taste and texture characteristics.

This process could be referred to as a "gas exchange" process inasmuch as the steps involve the substantial removal of the natural gaseous content of the produce, i.e. oxygen and air, by use of a low vacuum, followed by exposure of the produce to at atmosphere of other, toxic gases which replace the natural gaseous content.

It is to be emphasized that the operativeness of the present invention depends upon the particular order of treatment and that inadequate preservation of the produce results if a bactericidal gas is first employed, followed by an enzymocidal gas treatment. However, the enzymocidal and bactericidal gas treatments may take place substantially simultaneously with good results. Furthermore, if only an enzymocidal, or a bactericidal, gas is used, preservation of the produce will not be satisfactory. Either the produce will deteriorate to a putrid state and/or have undesirable discoloration.

While the present invention is broadly applicable to any biological harvested organ, e.g. fruits and vegetables generally, it is particularly important to the Rose family fruits, e.g. pears, peaches, cherries and apples, the root vegetables, e.g. carrots, turnips, beets and sweet potatoes, and the tuber vegetables, e.g. potatoes. Particularly important are apples and potatoes because of the large quantities consumed.

In more detail, the produce must first be prepared in such a manner that evacuation of the produce may be accomplished without unduly long time periods. In this regard, the produce is comminuted to a suitable size as by dicing, slicing, cubing, cutting or grinding. The particular amount of size reduction is not critical, but as will be appreciated, the more surface area of the produce exposed and the thinner the section of produce the more quickly the evacuation of the natural gases in the produce will take place. Conveniently, 1/16 inch to 1/2 inch slices are used, especially 1/4 inch to 3/8 inch. However, sections outside of this range may be used, e.g. up to 1 inch thick or greater. Of course, other geometric sections are suitable, e.g. French style strips, rings or wedges. While the time necessary to extract the natural gases of the produce will depend on the particular produce, its comminuted dimensions, the degree of vacuum applied, in general, the time necessary to attain the extraction according to the invention will vary between 2 and 12 minutes, although any desired time may be used as long as the requisite extraction of gases takes place.

Since many fruits and vegetables "brown" rapidly after being cut and exposed to air, it is preferred that the comminuting be done in a non-oxygen inert atmosphere, e.g. under nitrogen or any other like non-oxygen gas or vapor. Further, any storage of the comminuted produce prior to processing according to the invention, preferably, will also be under a non-oxygen atmosphere.

After the produce is comminuted to a suitable size, it is placed in a suitable evacuating apparatus which may establish and maintain a low vacuum. While the particular vacuum applied is not critical, it must be capable of substantially removing the oxygen content of the produce. The ultimate content of oxygen in the remaining space occupied in the evacuated produce should be no more than 0.10% by volume and for most produce no more than 0.05% by volume. A preferred range of oxygen content which is readily obtainable in a reasonable time period and produces good results from 0.01% to 0.05% by volume. Of course the greater the vacuum applied the faster evacuation will take place. Further, in order to extract the oxygen content to the necessary level, the vacuum must be low enough to create a pressure difference capable of pulling out a sufficient amount of oxygen. Accordingly, for most produce a vacuum of at least 15 inches of Hg is necessary. However, it has been found that to insure the requisite removal of oxygen, a vacuum of at least 29.0 inches of Hg is necessary, especially over 29.6 inches of Hg. For most produce, 2 to 12 minutes under a vacuum as described above will be sufficient to reduce the oxygen content of the produce to less than 0.05% by volume. However, time periods outside of this range may be used if desired. As will be appreciated from the above, a wide latitude of vacuum and time periods of evacuation are available to those skilled in the art, and simple tests will determine suitable degrees of vacuum and time periods for any produce with any type and degree of commutation. It is only necessary that the oxygen content be reduced to the above described levels.

After the produce is evacuated, it is preferably stored under a non-oxygen containing atmosphere, e.g. nitrogen, as described above, until such time as it is treated with the gases of the invention. The gas treatment consists of exposing the evacuated produce to an atmosphere of enzymocidal gases and subsequent to or simultaneously therewith to an atmosphere of bacterial gases. The pressure of the gases may be at atmospheric pressure or above. Of course, the greater the pressure the more rapidly will be the absorption of the gases. As an alternate, the produce may be exposed to the gases immediately after evacuation while the produce is still under vacuum. In this case, after evacuation, the gases are merely fed into the evacuation apparatus. Suitably, the amount of gases fed into the apparatus is sufficient to effect a pressure equal to the atmospheric pressure or greater, i.e. 1 to 20 atmospheres. The time necessary to expose the produce will depend on the particular produce, the comminuted size, the pressure of the gases in relation to the initial pressure on the produce, the type and amount of enzymes and bacteria in and on the produce and the particular gases being used. Generally speaking from 1/2 minute to 60 minutes is suitable, but times outside of this range may be used by adjusting the other variables. Time periods of gas exposure of from about 1 minute to 30 minutes will produce good results with most produce, at typical conditions, e.g. 1/4 to 3/8 inch discs, with easily obtainable pressure differentials between the pressure of the produce and gases and with typical amounts of enzymes and bacteria normally encountered.

As will be appreciated from the foregoing discussion, the entire process is suitable for operation at a near room temperature, but if desired reduced or elevated temperatures may be used, i.e. as low as near the freezing temperature of the produce up to normal cooking temperature (sterilization temperature). However, these reduced or elevated temperatures are not necessary and for most purposes not desirable. The preferred temperature is at or near room temperature, i.e. 60° to 80° F., since this results in an easily operated process for evident reasons. However, the process may be carried out at ambient temperatures in an unprotected area, i.e. cold winter or hot summer weather, and it is only necessary to protect the produce from freezing.

Since the purpose of the gas treatment is to inactivate the enzymes and substantially destroy the bacteria, suitable gas exposure times may be determined directly for any produce, gases and conditions by measuring the resulting enzyme and bacteria activity of a processed produce, according to methods known to the art. However, since these determinations are subject to some error, the best method is to simply test a plurality of samples under various conditions and time periods of the process and observe the length of time preservation is obtained. While this method may appear to be time consuming, it is in fact not the case, since unacceptably processed samples can normally be evident in about 30 days or less, e.g. discoloration, change in texture etc.

While any enzymocidal and bactericidal gases having the required activity may be used according to the invention, it has been found that certain gases possess very desirable activities and as such constitute a further important feature of the invention. In this regard carbon monoxide has been found to be a very effective enzymocidal gas and ethylene oxide has been found to be a very effective bactericidal gas. Sulphur dioxide has been found to be both enzymocidal and bactericidal. Hydrogen cyanide and ozone are also enzymocidal and bactericidal respectively, but require special and careful handling. Nitrogen is also an enzymocidal gas, but less effective for long time preservation than the foregoing gases.

The comminuted produce may be treated with the gases in substantial pure form or, if desired, diluted with an inert gas, such as nitrogen. Two or more gases and mixtures thereof may be used for each of the two treatments, provided that the enzyme inactivation precedes the bacteria inactivation or the two are at least simultaneous. The amount of dilution and ratio of members of a mixtures are not critical, but undue dilution will require substantial increases in exposure time, i.e. the exposure time is inversely proportional to the concentration of the active gases in a diluted mixture.

After the enzymocidal and bactericidal treatments, the residual gases contained in the produce may be removed, if desired, at least to a low level. In some cases, the substantial removal of these residual gases is most desirable or necessary from the taste and toxicity point of view, e.g. when sulphur dioxide or hydrogen cyanide gases are used. This may be accomplished in any desired way. For example, the produce may again be evacuated and then resaturated with sterile air, or the produce may be simply flushed with sterile air. Carbon monoxide and ethylene oxide are not substantially absorbed by the tissues of produce and consequently leave practically no trace after being exposed to an atmosphere or a flush of sterile air. Sulfur dioxide, on the other hand, is absorbed rapidly by the tissues and must be aerated by vacuum or flushing in order to provide an acceptable taste. In general, the sulfur dioxide content of the produce should be reduced to about 50 p.p.m. or less.

Packaging of the produce preserved by the present process may be as desired, e.g. plastic bags, cans, paper wrapping, etc. However, whatever packaging is selected, it should be accomplished in sterile air and with sterile packaging materials and containers to prevent contamination by bacteria and other noxious microorganisms. Many methods, materials and containers are well known to the art and further elaboration of this point is not required. It should be noted, however, that simple tight fitting jars made of glass or other impervious materials are quite suitable.

The chemical mechanisms responsible for the success of the present invention are not completely understood, however the following basic considerations should be noted. It may be assumed that when a food product is sealed in a container there will be included microorganisms which, unless they are destroyed, will thrive under the environmental conditions afforded and cause spoilage of the food. Furthermore, when most fruit and vegetable tissues are injured in any way or cut, a darkening of the tissues, called the browning reaction occurs. Some browning reactions are enzymatic, and take place when the tissues still contain active enzymes.

Most evidence suggests that oxidation of phenols or polyphenols by enzymes is the principal reaction in enzymatic browning. The nomenclature for the enzyme which causes oxidation of phenols or of polyphenols is not standardized and is alternately called phenol oxidase, polyphenoloxidase, phenolase and polyphenolase. To prevent browning, therefore, it is necessary to inactivate the enzymes present in the tissues.

Food also may act both as a vehicle carrying pathogenic microorganisms and as a culture medium for the growth of pathogens; consequently, it is essential that food products be treated in such a way that these disease causing microorganisms are killed or their growth is inhibited. Some of the more common microorganisms are *Escherichia coli, Clostridium botulinum, Streptococcus faecalis, Salmonella typhimurium, Staphylococcus aureus,* and molds, e.g. *Aspergillus niger.*

A number of compounds may act as substrate for the polyphenoloxidase in browning reactions, including catechol, hydroquinone, anthocyanins and flavonoids. The course of the reaction is not fully known. Oxygen acts as hydrogen acceptor, carbon dioxide is often evolved, a quinone forms and the final pigment is a polymer.

Although there are several enzyme systems present in plant tissues, it is taken by those skilled in the art of food technology, that destruction of the polyphenoloxidase indicates that the remaining enzymes have also been inactivated.

The invention will be illustrated by the following examples, but it should be clearly understood that the examples do not limit the scope of the invention and that the process is applicable to the breadth described above.

EXAMPLES 1-24

The following general procedures were followed for Examples 1-24.

Pure cultures of micro-organisms that are ubiquitous and are implicated in spoilage of food products as well as to be the main causative agents of food poisonings and infections, were selected as test organisms. These include *Escherichia coli* ATCC 11229, an index of sanitation and spoilage organism; *Aspergillus niger,* a mold that had previously been isolated from samples treated with gases; the sporeformer *Clostridium botulinum/I;* a coagulase positive *Staphylococcus aureus* ATCC 6538; *Streptococcus faecalis* ATCC 6057; and *Salmonella typhimurium.*

The test bacteria were grown in Brain Heart Infusion broth (DIFCO) for 1 hours at 37° C. The bacterial cells were harvested by centrifugation, washed twice with distilled water and suspended in buffered dilution water. The inoculum was adjusted to a population of approximately 1,000,000 cells per gram or product. The standardized spore suspension of the *Clostridium botulinum* was diluted to an equivalent of 100,000 spores per gram of product.

Apples and potatoes were selected for these examples because they represent important crops, are consumed in large quantities, have active enzyme systems, are easily found the year round.

A number of apples and potatoes purchased from a local supermarket were thoroughly washed and then placed in the preparation chamber. All cutting tools were sterilized prior to use. The chamber was made of heavy plastic film on an aluminum frame. Several outlets and parts allowed the connection of the chamber to a vacuum pump and a nitrogen gas source, as well as permitting the introduction of the raw materials, presterilized bottles, and stoppers, instruments used in the cutting of the products, and the removal of the filled jars and of the waste material. The chamber was so constructed as to allow the operator's hand to work inside the chamber.

The chamber was evacuated of air and pure nitrogen was replaced therefor. A slight positive pressure of nitrogen was maintained inside the chamber throughout the preparation period. The samples were therefore prepared in an atmosphere approaching 100 percent nitrogen, in order that oxidative enzymatic browning would not be initiated prior to the final treatment, with the appropriate gases. The produce was sliced into sections of about one gram weight and about ten sections were placed in each of 50 ml. capacity, rubber stoppered glass containers, and were then ready for further treatment. The bottles were inoculated, inside the chamber, with the test microorganisms as described above.

A modified Case anaerobic jar was used as the chamber for the evacuation and gas exposure of the samples. The jar had a capacity of 16 liters and was equipped with a vacuum-pressure gauge.

A vacuum of about 29 to 30 inches of Hg in the jar was drawn and maintained for about 10 minutes until substantially total evacuation of air from the environment and from within the produce was accomplished. The desired gas or gases as indicated in the following tablets was then allowed to flow into the chamber until the gauge returned to the zero position. The gas remained in contact with the produce for various lengths of time. The chamber was then evacuated for about ten minutes and the product was subsequently "washed" with sterile air for an additional ten minutes. A bacteriological glass filter was used in filtering the air. The chamber was then opened and the stoppers were securely adjusted in place to avoid recontamination.

In all cases, a gas analysis of the headspace of the bottled samples by the use of the Fisher-Hamilton-Partitioner operating with helium as the carrier gas, failed to register the presence of the tested gas, and therefore showed that the residual gas was removed by this evacuation-washing treatment.

The ten gram samples were transferred aseptically from each treatment bottle and tested after 7 days storage at room temperature for micro-organisms by methods known to the art. The results are shown in Tables 1 and 2 along with results of controls.

with sulfur dioxide, nitrogen, and carbon monoxide preventing color deterioration. Sulfur dioxide, and the combinations of carbon monoxide and ethylene oxide showed good results in preserving the apples by inactivating the enzymes and the bacteria.

What is claimed is:

1. Process for the preservation of raw and fresh biologi-

TABLE 1.—THE EFFECT OF CERTAIN GASES ON THE ORGANOLEPTIC AND MICRO-BIOLOGICAL BEHAVIOR OF POTATO DISKS

| Example | Organoleptic | | | Micro-biological [1] | | |
|---|---|---|---|---|---|---|
| | Color | Texture | Flavor | Total aerobes | Total anaerobe spores | Yeasts and molds |
| 1. Packaged in air* | Black | Liquid | Putrid | $10^9$ | $10^3$ | <10 |
| 2. Treated ten minutes with $N_2$* | White | do | do | $10^7$ | $10^4$ | <10 |
| 3. Treated ten minutes with $NO_2$* | Black | do | do | $10^8$ | $10^3$ | <10 |
| 4. Treated 10 minutes with CO* | Sl. dark | do | do | $10^8$ | $10^3$ | <10 |
| 5. Packaged in $SO_2$ | White | Whole | Sulfur | <10 | <10 | <10 |
| 6. Treated for 10 minutes with 10% EO, 90% $CO_2$, mixture packaged in $N_2$ | Black | do | Clean | <10 | <10 | <10 |
| 7. Treated with EO for 30 minutes and packaged in air | do | do | do | <10 | <10 | <10 |
| 8. Treated with EO for 120 minutes and packaged in $N_2$ | do | do | do | <10 | <10 | <10 |
| 9. Treated with EO for 120 minutes and packaged in air | do | do | do | <10 | <10 | <10 |
| 10. Treated with CO 15 minutes plus 30 minutes with EO; packaged in air | Sl. dark | do | do | <10 | <10 | <10 |
| 11. Treated with $SO_2$ 15 minutes plus 30 minutes with EO and packaged in $N_2$ | White | do | Sulfur | <10 | <10 | <10 |
| 12. Treated as in 11 packaged in air | do | do | do | <10 | <10 | <10 |

[1] Counts per gram of product.
*Control sample not processed according to invention.

TABLE 2.—THE EFFECT OF CERTAIN GASES ON THE ORGANOLEPTIC AND MICRO-BIOLOGICAL BEHAVIOR OF APPLE DISKS

| Example | Organoleptic | | | Micro-biological [1] | | |
|---|---|---|---|---|---|---|
| | Color | Texture | Flavor | Total aerobes | Total anaerobe spores | Yeasts and molds |
| 13. Packaged in air (control)* | Brown | Whole | Ethanolic | $10^6$ | <10 | $10^5$ |
| 14. Treated for 10 minutes with $N_2$* | Sl. brown | do | do | $10^5$ | <10 | $10^4$ |
| 15. Treated for 10 minutes with $NO_2$* | Brown | do | do | $10^5$ | <10 | $10^4$ |
| 16. Treated for 10 minutes with CO* | Sl. brown | do | do | $10^5$ | <10 | $10^4$ |
| 17. Treated for 10 minutes with $SO_2$ | White | do | Sl. taste | <10 | <10 | <10 |
| 18. Treated with 10% EO and 90% $CO_2$ for 30 minutes and packaged in $N_2$ | Brown | do | Clean | <10 | <10 | <10 |
| 19. Treated with EO for 30 minutes and packaged in air | do | do | do | <10 | <10 | <10 |
| 20. Treated with EO for 120 minutes and packaged in $N_2$ | do | do | do | <10 | <10 | <10 |
| 21. Treated with EO for 120 minutes and packaged in air | do | do | do | <10 | <10 | <10 |
| 22. Treated with CO 15 minutes plus 30 minutes with EO; packaged in $N_2$ | Sl. brown | do | do | <10 | <10 | <10 |
| 23. Treated as in 22 but packaged in air | do | do | do | <10 | <10 | <10 |
| 24. Treated with $SO_2$ 15 minutes plus 30 minutes with EO and packaged in $N_2$ | White | do | do | <10 | <10 | <10 |
| 25. Treated as in 24 but packaged in air | do | do | do | <10 | <10 | <10 |

[1] Counts per gram of product.
* Control sample not processed according to invention.

As can be seen from Table 1, the nontreated control potato samples packaged in air became dark and liquefied, at the end of seven days. Similarly the samples treated with nitrous oxide displayed darkening, liquefaction, and putrefaction. Samples treated in nitrogen remained light, while microorganisms continued to grow resulting in liquefaction of the product, accompanied by putrefaction. Potato disks packaged in sulfur dioxide remained white and whole demonstrating the effectiveness of sulfur dioxide against enzymatic and microbial agents. Treatment with ethylene oxide and ethylene oxide and $CO_2$ resulted in complete inactivation of the microorganisms but had no effect on browning enzymes. Carbon monoxide had no effect on microorganisms but afforded substantial freedom from color deterioration. The carbon monoxide-ethylene oxide treatment proved satisfactory with only slight discoloration occurring. The product remained whole and the flavor was clean.

The results obtained with apple disks as shown in Table 2 indicate the effect of the various gases on color were comparable to the effect observed with potato disks cal harvested produce which consists essentially of the steps of:

(1) comminuting the produce to sections of between about 1/16 to 1 inch in thickness;

(2) subjecting said comminuted produce to a subatmospheric pressure of at least 15 inches of Hg vacuum for a period of time at least sufficient to substantially evacuate the gaseous oxygen content from the tissue structure thereof;

(3) subsequently exposing said substantially oxygen-free produce to an enzymocidal gas which is carbon monoxide for a time period at least sufficient to substantially deactivate the deteriorative oxidative enzyme content within said produce; and (4) simultaneously with or subsequent to step 3, also exposing said produce to a bactericidal gas consisting essentially of ethylene oxide for a period of time at least sufficient to sterilize the said produce;

whereby said produce is rendered substantially biostatic and preserved against normal bacterial and enzymatic deterioration and spoilage on sustained storage.

2. The process of claim 1 wherein the comminution and storage of the comminuted produce prior to step 2 is accomplished in an inert oxygen-free atmosphere.

3. The process of claim 1 wherein the oxygen content of the remaining space occupied in the produce after being subjected to the sub-atmospheric pressure of step 2 is no more than 0.10% by volume.

4. The process of claim 1 wherein the oxygen content of the remaining space occupied in the produce is between about 0.01% to 0.05% by volume and the vacuum of step 2 is at least about 29 inches of mercury.

5. The process of claim 1 wherein the enzymocidal gas of step 3 and the bactericidal gas of step 4 are at pressures of at least about atmospheric pressure.

6. The process of claim 1 wherein steps 1 through 4 are carried out at ambient temperatures.

7. The process of claim 1 wherein the gases of step 3 and step 4 are removed subsequent to step 4.

8. The process of claim 1 wherein after step 3 the so processed produce is stored at ambient temperatures.

9. The process of claim 8 wherein the gases of steps 3 and 4 are removed from the produce prior to storage.

10. The process of claim 9 wherein the storage is accomplished by packaging the produce in impervious material under sterile air conditions.

References Cited

UNITED STATES PATENTS

| | | | |
|---|---|---|---|
| 2,080,179 | 5/1937 | Merriam et al. | 99—154X |
| 2,189,947 | 2/1940 | Griffith et al. | 99—225 |
| 2,506,793 | 5/1950 | Kalmar et al. | 99—154 |
| 2,955,940 | 10/1960 | Williams | 99—154 |
| 3,102,777 | 9/1963 | Bedrosian et al. | 21—58 |
| 3,102,779 | 9/1963 | Brody et al. | 21—58 |
| 3,411,894 | 11/1968 | Lieberman et al. | 71—68 |
| 3,470,000 | 9/1969 | Hale et al. | 99—193 |

FOREIGN PATENTS

| | | | |
|---|---|---|---|
| 245,671 | 1/1926 | Great Britain | 99—154 |
| 511,492 | 8/1939 | Great Britain | 99—154 |

NORMAN YUDKOFF, Primary Examiner

F. E. DRUMMOND, Assistant Examiner

U.S. Cl. X.R.

99—189, 207, 211, 225; 21—58